J. E. SWAIN.
SLIDING GATE.
APPLICATION FILED AUG. 3, 1910.
1,012,478.
Patented Dec. 19, 1911.
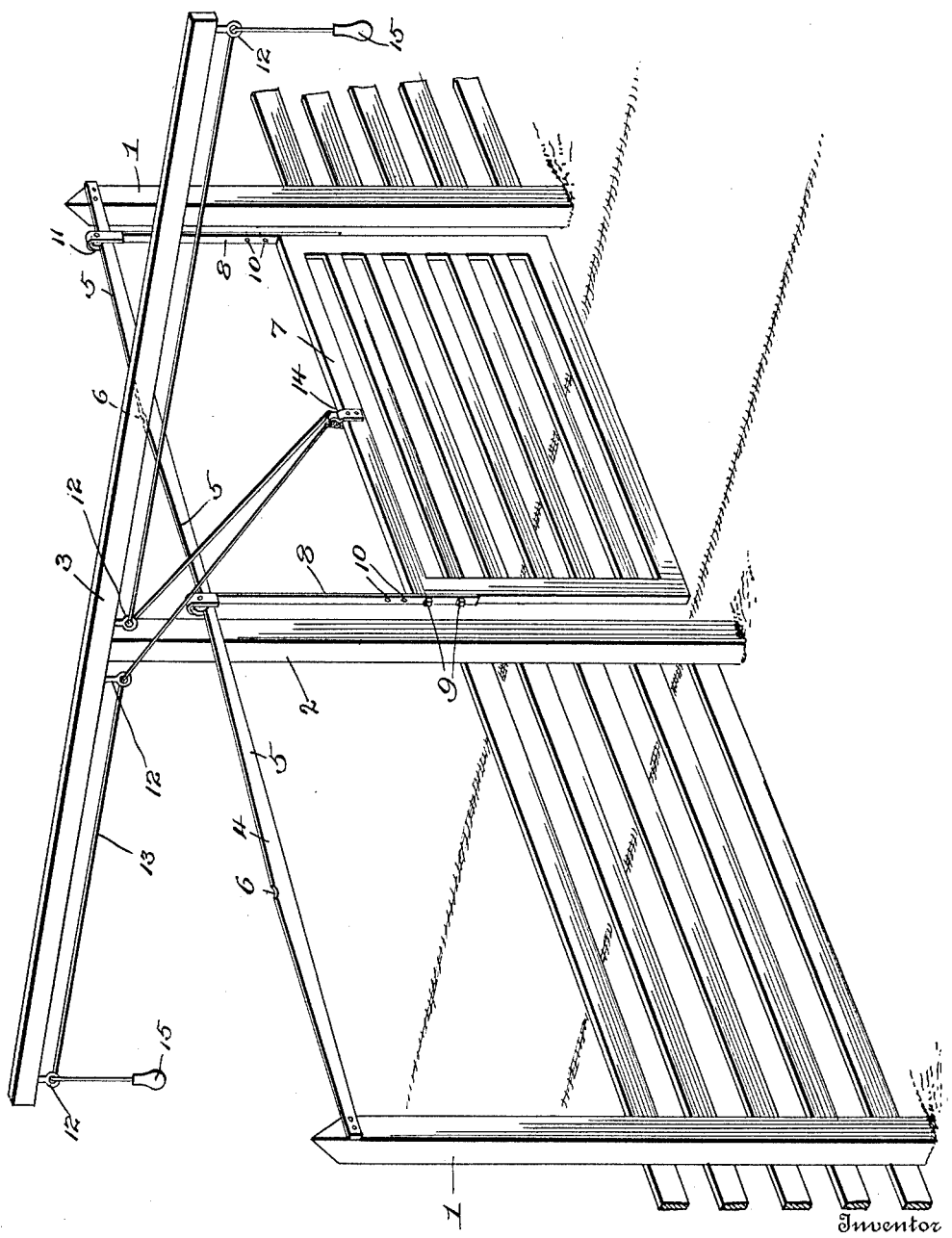
Witnesses
Elsie C. Blakistone
J. M. Fowler Jr.
Inventor
John E. Swain
By
[Attorney signature]
Attorney

UNITED STATES PATENT OFFICE.

JOHN E. SWAIN, OF SALIDA, COLORADO.

SLIDING GATE.

1,012,478.      Specification of Letters Patent.      Patented Dec. 19, 1911.

Application filed August 3, 1910. Serial No. 575,250.

*To all whom it may concern:*

Be it known that I, JOHN E. SWAIN, a citizen of the United States, residing at Salida, in the county of Chaffee and State of Colorado, have invented certain new and useful Improvements in Sliding Gates, of which the following is a specification.

This invention relates to gates and mechanism for operating the same, and one of the principal objects of the invention is to provide an easily operated sliding gate mounted upon a track and provided with an operating cord for opening or closing the gate by sliding the same upon the track.

Another object of the invention is to provide a gate comprising a track, a gate having upright bars provided with rollers mounted on said track, and a flexible cord or cable connected to the center of the upper bar of the gate and said cord or cable extending through guides and adapted to be drawn downward at either end for opening or closing the gate alternately.

These and other objects may be attained by means of the construction shown in the accompanying drawing, in which, the figure is a perspective view of a gate and its operating mechanisms made in accordance with my invention.

Referring to the drawing the numerals 1 designate the gate posts and 2 is a central post on which is mounted a horizontal bar 3. A metal track rail 4 is secured at its ends to the posts 1, said track rail having its upper edge provided with a series of inclines 5 separated by central notches 6 at the highest points of said inclines. The gate 7 which may be of any suitable type is provided at its opposite ends with suspension bars 8, said bars being secured to the opposite ends of the gate by means of bolts or pins 9 adapted to be adjusted in a series of holes 10 in the suspension bars 8 for adjusting the gate at the required height from the ground. At the upper ends of the bars 8 grooved rollers 11 are journaled, said rollers being mounted to move over the upper edge of the track 4. The bar 3 extends in line with the road and is disposed upon one side of said road. Guides or screw eyes 12 are secured underneath the bar 3 and an operating cord or cable 13 is secured at a nearly central point to a clip 14 connected to the upper bar of the gate near the center of said bar. Upon the ends of the operating cord or cable 13 handles or weighted knobs 15 are provided.

The operation of my gate may be briefly described as follows: When the gate is closed and it is desired to open the same from either side thereof, by pulling down the handle or knob 15, the gate is moved upon the track 4, said gate being raised gradually on account of the inclines 5, off the ground, and when fully opened permitted to again descend to the required position. The notches 6 permit the gate to stop half way open when a pedestrian desires to enter through the gate.

From the foregoing it will be obvious that a gate made in accordance with my invention is of simple construction; can be manufactured at low cost; cannot readily get out of order; can be opened or closed from either side; and will operate smoothly under varying conditions.

I claim:

A gate comprising a central post and two gate posts, a flat metal track secured to said gate posts at opposite ends, the upper edge of said track having double oppositely inclined portions provided with notches at the apices of said inclined portions, a gate provided with sustaining bars adjustably connected to its opposite ends, rollers journaled in the upper ends of said bars and mounted to run on said track and to engage said notches to stop the gate, a bar rigidly secured at the top of said central post and extending at right angles to said gate, guides on said bar and a single operating cord or cable rigidly connected to the top near the center of said gate, said cord extending through said guides and provided with depending handles for operating the gate.

In testimony whereof I affix my signature in presence of two witnesses.

JOHN E. SWAIN.

Witnesses:
    J. D. ADAMS,
    G. D. CLARK.

---

Copies of this patent may be obtained for five cents each, by addressing the "Commissioner of Patents, Washington, D. C."